United States Patent [19]

Johnson

[11] Patent Number: 4,698,059
[45] Date of Patent: Oct. 6, 1987

[54] ENTERAL FEEDING TUBES

[75] Inventor: Theodore D. Johnson, Largo, Fla.

[73] Assignee: Concept Polymer Technologies, Inc., Clearwater, Fla.

[21] Appl. No.: 912,217

[22] Filed: Sep. 26, 1986

Related U.S. Application Data

[63] Continuation of Ser. No. 559,685, Dec. 9, 1983, abandoned.

[51] Int. Cl.$^4$ ............................................. A61M 31/005
[52] U.S. Cl. ...................................... 604/270; 604/280
[58] Field of Search ....................... 604/280, 281, 270

[56]    References Cited
U.S. PATENT DOCUMENTS

| | | |
|---|---|---|
| 1,899,181 | 2/1933 | Twiss ................................. 604/270 |
| 2,655,489 | 10/1953 | Lawson . |
| 2,888,419 | 5/1959 | Safford . |
| 2,992,201 | 7/1961 | Gober, Jr. . |
| 3,239,478 | 3/1966 | Marlan, Jr. . |
| 3,272,766 | 9/1966 | Gowman . |
| 3,441,530 | 4/1969 | Bauer et al. . |
| 3,445,420 | 5/1969 | Kookootsedes et al. . |
| 3,459,831 | 8/1969 | Luftglass et al. . |
| 3,485,787 | 12/1969 | Hacfele et al. . |
| 3,576,913 | 4/1971 | Johnson et al. . |
| 3,766,295 | 10/1973 | Crossland et al. . |
| 3,795,646 | 3/1974 | MacKenzie, Jr. et al. . |
| 3,817,248 | 6/1974 | Buckles et al. . |
| 3,830,767 | 8/1974 | Condon . |
| 3,865,766 | 2/1975 | Merrill . |
| 3,896,815 | 7/1975 | Fettel et al. . |
| 3,919,157 | 11/1975 | Ide et al. . |
| 4,006,116 | 2/1977 | Dominguez . |
| 4,039,629 | 8/1977 | Himes et al. . |
| 4,041,103 | 8/1977 | Davison et al. . |
| 4,049,595 | 9/1977 | Dominquez . |
| 4,108,825 | 8/1978 | Hayes . |
| 4,123,409 | 10/1978 | Kaelble . |
| 4,143,651 | 3/1979 | Patel . |
| 4,157,094 | 6/1979 | Patel . |
| 4,196,731 | 4/1980 | Laurin et al. . |
| 4,198,983 | 4/1980 | Becker et al. . |
| 4,270,542 | 6/1981 | Plumley ................................. 604/270 |
| 4,386,179 | 5/1983 | Sterling . |
| 4,410,320 | 10/1983 | Dykstra et al. ...................... 604/270 |
| 4,516,970 | 5/1985 | Kaufman et al. .................... 604/270 |
| 4,547,192 | 10/1985 | Brodsky et al. ..................... 604/270 |

Primary Examiner—C. Fred Rosenbaum
Assistant Examiner—Sherri E. Vinyard
Attorney, Agent, or Firm—Sherman & Shalloway

[57] ABSTRACT

An enteral feeding tube includes a unitary, molded weighted bolus insert molded to a preformed tubular stem. The bolus and stem are each formed from a polymeric composition including a thermoplastic elastomeric block copolymer, e.g. styrene-ethylene-butylene-styrene, and an essentially linear polysiloxane having a kinematic viscosity at room temperature of 20 to $10^6$ centistokes, and optionally, polypropylene and/or mineral oil. The bolus is weighted with tungsten powder mixed into the polymeric composition. The bolus includes a central bore extending over at least a portion of its length and communicating with the interior of the stem and to the exterior of the bolus.

27 Claims, 6 Drawing Figures

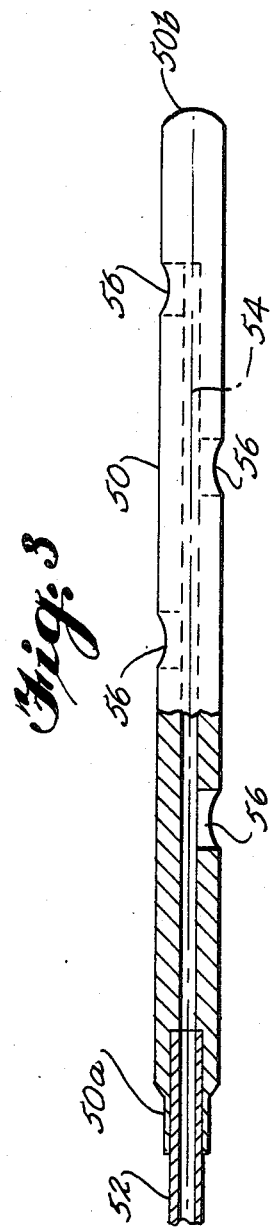

ENTERAL FEEDING TUBES

This application is a continuation, of application Ser. No. 559,685, filed Dec. 9, 1983 now abandoned.

BACKGROUND OF THE INVENTION

1. Field of the Invention

The present invention relates to enteral feeding tubes. More specifically, this invention relates to enteral feeding tubes formed of a polymeric composition comprising a block copolymer and a polysiloxane, and a unique weighted bolus for use therewith.

2. Description of the Prior Art

Enteral feeding (stomach and intestinal feeding) is commonly used to nourish patients who, for a variety of reasons, cannot consume food normally. Compared with intravenous (parenteral) feeding, enteral feeding is a more natural way to supply the patient with nutrition while helping to reduce possible infection and vein damage.

Conventional enteral feeding tubes are made of polyvinylchloride, elastomeric silicone or polyurethane. These materials have been found to be unsatisfactory for the following reasons. For polyvinylchloride, stomach acids can leach out the plasticizer from the polyvinylchloride. If the tube is left in the stomach for an extended period of time, the leached tube hardens and becomes brittle and distorted. As is apparent, this causes patient discomfort and can make removal of the tube difficult and painful. On the other hand, elastomeric silicone tubing is much softer and resists hardening. However, because of its limpness, an elastomeric silicone tubing is extremely difficult to insert and position in the stomach. Although polyurethane tubes have intermediate flexibility and are easier to insert than silicone, they are still difficult to insert and position.

In general, an enteral feeding tube comprises an elongated stem (tube body) having two ends—a distal end which ultimately is positioned within the stomach or intestines of a patient and a proximal end which remains out of the patient and preferably is equipped with a connector for attachment to a nutritional support system. The distal end may be joined to a weighted terminal (bolus) and the proximal end may have a female connector with an integrally formed closure plug. The connector and bolus usually are connected to the stem by bonding agents or adhesives. As a result of the use of these bonding agents, a secure bond may not be achieved and additional foreign substances are introduced into the body of the patient.

The weighted bolus normally comprises a pouch containing therein a heavy material. Mercury has been most often used as the weighted material. However, inasmuch as mercury is a highly toxic material and can cause much harm to the patient should the pouch burst, a substitute therefor should be used.

In order to administer nutrients to the patient through the enteral feeding tubes, current tubes have openings formed in the wall of the tube body proximally of the weighted bolus. These openings create weakened areas in the tube body which may cause the tubes to kink and, thus, to occlude the tube and obstruct the flow of nutrient. Because of the use of mercury or other such materials in the bolus, it heretofore has been impossible or impractical to provide the openings in the bolus itself where the likelihood of kinking would be greatly reduced or totally eliminated.

Thus there is a need for an enteral feeding tube formed of a material which is easy to handle because of the desired degree of flexibility, can withstand the action of stomach acid and have a smooth surface which will not irritate the patient's tissues. Moreover, there is a need to eliminate the hazards associated with the use of mercury and other unbonded substances in the weighted bolus and also to eliminate or greatly reduce the possibility of kinking and its associated problems. The present invention was made with the objective of overcoming the known shortcomings of conventional enteral feeding tubes.

SUMMARY OF THE INVENTION

The present invention provides an enteral feeding tube formed of a polymeric composition comprising a thermoplastic elastomeric hydrocarbon block copolymer and a polysiloxane. The block copolymer comprises blocks of styrene-ethylene-butylene-styrene wherein the styrene blocks have a molecular weight of 5,000 to 40,000 and the ethylene-butylene block, 20,000 to 500,000. The polysiloxane has a kinematic viscosity of 20 to $10^6$ centistokes at room temperature.

In one embodiment of the invention, the distal end of the enteral feeding tube is provided with a weighted bolus formed from a unique formulation of a polymeric composition and tungsten. The tungsten is a heavy material that, when compounded with the polymeric composition, may be molded into a variety of configurations and, preferably, it may be insert molded directly onto the distal end of the tube body. This eliminates the necessity of using bonding agents to secure the bolus to the tube.

Also, the unique compounded bolus formulation may be molded or otherwise formed into a hollow configuration which permits the formation of openings directly in the bolus, thus, avoiding the requirement of having the openings in the tube body where kinking may occur.

As a further advantage of the present invention, because of the compatibility of materials utilized in the construction of the tubing stem and the connector, these components also may be firmly secured together during the insert molding of the connector directly onto the proximal end of the tubing without the use of bonding agents.

BRIEF DESCRIPTION OF THE DRAWINGS

FIG. 3 shows in detail the distal end of the enteral feeding tube of FIG. 2.

FIG. 4 illustrates the distal end of the present enteral feeding tube wherein an opening is provided at the distal end of the weighted bolus.

FIG. 5 shows the distal end of the present enteral feeding tube having no weighted bolus.

DETAILED DESCRIPTION OF THE INVENTION

Figure 1:
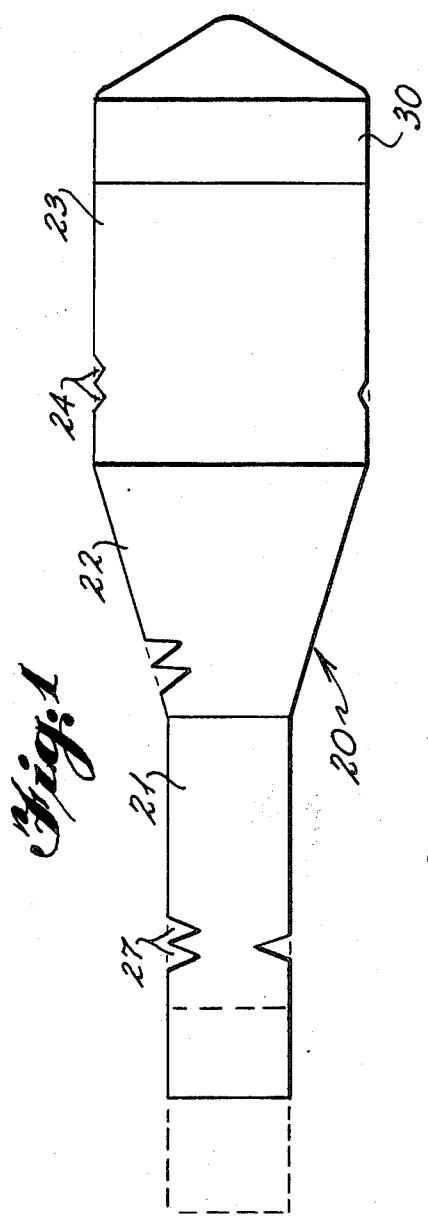
FIG. 1 shows an extruder screw useful in forming the present enteral feeding tube.

The present invention provides enteral feeding tubings formed of a composition comprising a substantially uniform mixture of an elastomeric thermoplastic hydrocarbon block copolymer and a polysiloxane. The composition, which may contain more than one hydrocarbon block copolymer, possesses physical and surface properties which avoid all of the above-described problems found in conventional enteral feeding tubes.

In its simplest form, the composition comprises from about 0.1 to 12 percent, by weight, of the polysiloxane, the remainder being the block copolymer. This represents an unusual result primarily because of the dissimilar nature of the polysiloxane molecule compared to the hydrocarbon backbone of the elastomeric macromolecule.

The polysiloxane content of the composition becomes even more unusual where the latter includes an appreciable amount of mineral oil. In fact, the mineral oil may even represent 60 percent of the composition's total weight. Nonetheless, the composition appears able to take up an appreciable amount of polysiloxane and achieve the beneficial results.

The composition may include other additives such as polypropylene, generally in an amount less than 45 percent of the total weight of the composition. In addition, antioxidants and radiopaque materials may be included in the composition.

The block copolymer which preferably comprises from about 23 to 73 percent by weight of the total weight of the composition may have an A - B, preferably A - B - A, configuration in which A takes the form of a monovinyl arene polymer block. To provide the elastomeric properties, B may be a hydrogenated or nonhydrogenated conjugated diene polymer block. The copolymer may contain more than two or three blocks suggested above. It may have several interspersed A and B blocks linearly interconnected as A - B - A - B - A - B. Alternately or additionally, the block copolymer may have blocks with a branched connection to the main chain as $$A-B-A-A-A-B-A.$$
$$\begin{array}{c}|\\B\\|\\A\end{array}$$

For the present invention, the A - B - A structure will be used to encompass all of these variations in polymer block structure.

The styrene-ethylene-butylene-styrene macromolecule represents a prime example of this type of block copolymer, wherein the styrene blocks typically constitute about 20 to 50 percent of the copolymer's weight while the ethylene-butylene block provides the remaining 50 to 80 percent. The styrene blocks themselves normally have a molecular weight in the range of 5,000 to 40,000. The ethylene-butylene block has a molecular weight greatly exceeding that of the styrene blocks and falling within the approximate range of 20,000 to 500,000. The total molecular weight of the copolymer typically ranges from 50,000 to 600,000. By molecular weight, it is meant either the weight average or number average molecular weight, since for the block copolymers useful in the present invention there is little difference between these molecular weights.

When more than one block copolymer is used to prepare the polymeric composition, the block copolymers have different contents of terminal A blocks and middle B blocks.

The polysiloxane, which is an essentially linear polysiloxane, has a kinematic viscosity within the range of about 20 to $10^6$, preferably about 200 to 13,000, centistokes at room temperature (20° to 25° C.). A typical example of the polysiloxane is silicone oil. The polysiloxane has the repeating structure:

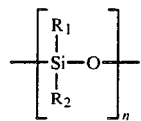

wherein $R_1$, $R_2 =$ H, $CH_3$, or 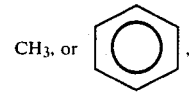, with $CH_3$ being preferred, and n is a positive integer having a value ranging from 10 to 20,000.

Examples of such block copolymers are described in a series of U.S. patents issued to the Shell Chemical Company namely: U.S. Pat. Nos. 3,485,787; 3,830,767; 4,006,116; 4,039,629; and 3,041,103.

Adding a polysiloxane, preferably silicone oil, to one or more elastomeric, thermoplastic hydrocarbon block copolymers accomplishes several distinct and desirable results. Initially, the composition displays a substantial improvement in its processability. This has particular importance when the material is formed into thin webs. Without the polysiloxane, the material appears to have flow and surface properties which cause the molten plastic to form globules, thus a rough surface.

The surface effects produced by the polysiloxane appear to derive from a slightly increased concentration of silicone molecules at the composition's surface. The processing techniques discussed below should typically result in a uniform dispersement of the polysiloxane throughout the composition. However, a slight migration of the silicone molecules to the material's surface may occur. As a result, the material's surface, to a depth of about 5.0 to 20.0 nm, appears to have a concentration of silicone molecules approximately twice that of the bulk of the material. The thinness of this layer, of course, prevents the greater concentration there from affecting the bulk concentration of the polysiloxane throughout the material. Consequently, on a macroscopic scale, the material has a substantially uniform dispersement of the polysiloxane. This gives the surface substantially different properties than the hydrocarbon block copolymer without the polysiloxane.

Typically, the middle or B, block of the A - B - A elastomeric hydrocarbon block copolymer provides the molecule with its elastomeric properties; the B blocks themselves possess the rubber qualities. Polymers formed from conjugated dienes have found favor in this role. Butadiene and isoprene represent monomers which, after polymerization, have provided the middle, elastomeric block.

The resulting block copolymer typically has its mechanical properties determined primarily by the elastomeric B block. Accordingly, the middle block should provide at least a majority of the block copolymer's total molecular weight. In fact, it usually provides 50 to 80 percent of the molecular weight of the final product. The molecular weight of the middle B block usually falls within the range of 20,000 to 500,000 and typically comes within the narrower range of 20,000 to 200,000.

The terminal, or A, blocks of the copolymer provide the cohesiveness between the individual macromolecules in the thermoplastic rubber. These terminal blocks themselves behave as a thermoplastic. They do not usually display any elastomeric quality. However, representing a minority of the weight of the final elastomer, they do not impart their own mechanical properties to the product.

The thermoplastic adherence between molecules of the A blocks replaces the vulcanization of the natural, latex, or silicone rubbers. In vulcanization, actual chemical bonds develop between the macromolecules constituting the rubber. These crosslinking reactions generally occur at elevated temperatures and thus impart the name "thermoset" to the materials. These rubbers generally require extensive periods of time to "cure": or undergo the required crosslinking. The crosslinking does not represent a reversible process. As a consequence, the nonthermoplastic rubbers, once cured to a particular form, cannot melt to adopt a different form. At elevated temperatures they only oxidize or, in more extreme cases, burn.

The terminal A blocks of the block copolymer adhere to each other through physical attraction bonds characteristic of all thermoplastics. Thus, when in the solid form, the terminal blocks of several molecules adhere to each other to provide the required cohesiveness throughout the material. These particles serve to bind the sundry macromolecules in the mass into an integral whole.

At elevated temperatures, these "particles" of physically bonded terminal blocks of different macromolecules actually melt. The entire mass of material then assumes the liquid or molten state and can undergo the usual processing techniques such as injection molding. When cooled, the terminal blocks of different macromolecules again physically bond to each other and form particles. The material then generally retains the shape it possessed when the particles formed by the terminal A blocks coalesced into the solid state.

The class of molecules labeled monovinylarenes have provided suitable thermoplastic terminal A blocks for these polymers. Examples of the monomers which can polymerize into the terminal blocks include isoprene and alphamethyl isoprene. The former of these two has generally received greater use.

The terminal A blocks generally have a molecular weight within the range of 5,000 to 40,000, and most fall within the range of 8,000 to 20,000. The terminal blocks constitute about 20 to 50 percent of the total weight of the macromolecule.

As discussed above, the elastomeric block copolymer molecule may include more than two or three blocks suggested by the A - B - A formula. The macromolecule may contain additional blocks arranged in either the linear or branched fashion. In this eventuality, the thermoplastic A block may not actually represent the terminal blocks at all ends of the molecule. In any event, the macromolecule generally has a total molecular weight falling within the range of 50,000 to 600,000.

As mentioned previously, one or more of the block copolymers may be used in forming the composition. When more than one block copolymer is used, the block copolymers differ from each other with respect to the amounts of terminal A blocks and middle B blocks present therein. For instance, a mixture of a first block copolymer containing about 28 percent by weight styrene block A (e.g., Shell Kraton G 1650) and a second block copolymer containing about 33 percent by weight styrene block A (e.g., Shell Kraton G 1651) can be used. The weight ratio of the first : second block copolymer can vary from 15:85 to 50:50.

The polysiloxane has the following repeating structure:

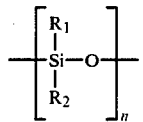

where $R_1$, $R_2 =$ H, $CH_3$, or 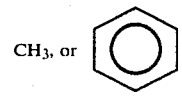

and n is a positive integer between 10 and 20,000. The readily available silicone oils generally employ the methyl group for both of the radicals $R_1$ and $R_2$. The polysiloxane is essentially linear as shown in the above formula. A preferred example of the polysiloxane is silicone oil.

The viscosity of the polysiloxane should permit its facile coating of and mixing with the crumbs or pellets of the elastomer. This results in a general requirement that the kinematic viscosity be within the range of about 20 to 1,000,000 centistokes at room temperature. At the lower end of the above range, the polysiloxane encounters some difficulty in coating the polymer pellets. As a preferred embodiment, silicone oil having a kinematic viscosity of 200 to 13,000 centistokes works well without complication.

For the present invention, a medical grade polysiloxane should be employed. Furthermore, devolatilizing the polysiloxane prior to its introduction to the block copolymer removes very low molecular weight elements that could leach and irritate the patient's tissues.

The polysiloxane generally constitutes about 0.1 to 12 percent of the total weight of the elastomeric composition, preferably from 1 to 7 percent. The ability of the hydrocarbon to take up this amount of the polysiloxane is surprising; the hydrocarbon backbone of the polymer has a drastically disparate nature as compared to the silicone structure of the polysiloxane.

The surprise becomes even greater for polymeric compositions that already include substantial amounts of mineral oil as a lubricant. Mineral oil, if present, may account for up to 60 percent of the total weight of the composition. Typically, the mineral oil constitutes from 25 to 50 percent of the composition's total weight.

Furthermore, the mineral oil and the polysiloxane also have distinctly different chemical properties. The former has a hydrocarbon composition as compared to the silicone of the polysiloxane. Moreover, the mineral oil fills the spaces that would presumably accommodate the polysiloxane. Yet, a composition having 50 percent of mineral oil can still assimilate several percent of the polysiloxane to produce a drastically different elastomer.

Adding polypropylene as a binder to the present elastomeric composition produces a stiffening effect upon the elastomeric composition. The polypropylene also reduces its elasticity slightly. The amount of added polypropylene generally remains less than 45 percent of the composition's total weight. It more usually falls within the range of 2 to 20 percent or in the narrower range of 5 to 10 percent. The addition of bismuth oxychloride or barium sulfate provides the polymeric composition with an opacity to X-rays. Titanium dioxide pigment can also be added to affect the polymer's visual appearance.

The following represents a summary of the weight percentages of the components in the present polymeric composition

| Component | Weight % | |
|---|---|---|
| | Broad | Preferred |
| Polysiloxane | 0.1–12 | 1–7 |
| Polypropylene | 0–45 | 1–30 |
| Mineral Oil | 0–60 | 25–50 |
| Block copolymer | balance | 20–73 |

The block copolymer is, by nature, a hydrophobic composition and its surface remains unwetted. Water absorption by the copolymer is low as indicated by ASTM-D-570. Scanning electron micrographs of the surface of the copolymer show a smooth, closed surface, free of surface interruptions or defects. Qualitative observation of the copolymer surface when wet with water indicates that the surface tends to have a slick and lubricious feel. No coating is used to obtain this surface characteristic which is believed to be inherent in the silicone nature of the surface.

Both the surface smoothness and concentration of polysiloxane portend a blood and tissue compatibility of the material. Both factors reduce the likelihood of the attachment and clotting of blood components to the polymer.

Preparing the elastomeric composition with the dispersed polysiloxane begins with the hydrocarbon block copolymer. The techniques for preparing the elastomeric thermoplastics appear in many references including the patents referenced above. The inclusion of the usual additives also appears in these discussions.

Mixing the crumbs or pellets of one or more of the elastomeric copolymers, having different amounts of the constituent blocks, with the polysiloxane should result in a coating of the former with the latter. To do so, the pellets or crumbs and the polysiloxane may be mixed in a tumbler. Any additional ingredients, such as polypropylene, polystyrene, and/or stabilizer may also be added to the mixture at this point.

The coated elastomer pellets or crumbs next receive sufficient heat to induce their melting. Applying a shearing pressure to the melted coated crumbs or pellets appears to induce a substantially uniform dispersement of the polysiloxane in the mixture. The heat required to effectuate the melting, of course, depends upon the individual elastomer. Typically, it ranges from 160° C. to 225° C.

After melting the block copolymer by heating, the mixture comprising the block copolymer, the polysiloxane and other suitable ingredients described above may be optionally fed through a plurality of calender rolls to form sheets of the mixture. Thereafter, the sheets are subjected to shearing pressure by feeding the cut strips of sheets to an extruder or a compression molding machine for better dispersement of the polysiloxane.

To ensure adequate dispersement of the polysiloxane, the composition is subjected to an appropriate amount of of pressure, usually about 1,500 p.s.i. However, it has been found that by increasing the pressure, further improved properties of the product are obtained. Thus, the molten mixture may be subjected to pressures of 2,500 p.s.i., 3,000 p.s.i., or higher.

An extruder provides the most convenient means of achieving the temperatures and pressures required to disperse the polysiloxane within the composition. An extruder typically has several temperature zones and thus can pass the crumbs or pellets of the polymer through the temperature stages required for melting. FIG. 1 shows an extruder screw generally at 20 modified to apply a greater shearing pressure to the resin material.

The screw 20 has the four zones characteristic of most extruder screws. The first section 21, known as the feed zone, initiates the melting of the polymer pellets and moves them along to the compression or transition zone 22. In zone 22, the polymer generally completely melts and undergoes a sufficient shearing stress to cause thorough mixing of the ingredients. The metering section 23 usually provides the melted resin to the die at a known rate and pressure. Working section 30 allows mixing of the polymer melt.

The screw shown in FIG. 1 has a length-to-diameter ("L/D") ratio of 24:1. In this type of screw, the metering section 23 typically has about 20 to 25 percent of the total flights, or pitch lengths, of the entire screw. On the modified screw 20 shown in FIG. 1, the metering section 23 has ten flights 24 of the screw's total of 24.62 flights; the feed section 21 has 6.62 flights 27, and the transition section 22 has eight flights. Thus, for the screw 20, the metering section 23 has 40 percent of the total flights. This large fraction of the flights increases the length of time that the resin remains in the metering section 23 and the amount of pressure applied to it.

Figure 1A:
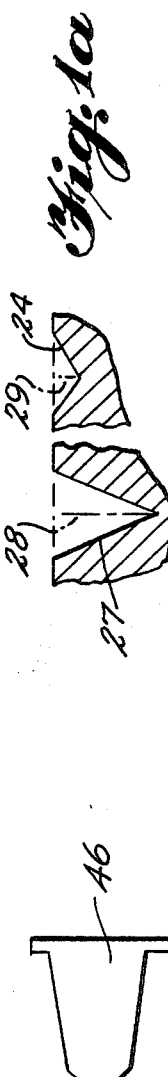
FIG. 1a shows the flights in the material and feed sections of the screw of FIG. 1.

Furthermore, as shown in FIG. 1a, the flights 24 of the metering section 23 have a much smaller cross-sectional area than the flights 27 of the feed section 21. In fact, the depth 28 of the feed-section flight 27 amounts to four times the depth 29 of the metering-section flight 24. This high compression ratio of 4:1 drastically increases the pressure applied to the material in the metering section 23. To increase the pressure even further, the compression ratio of the feedsection flights 21 to those in the metering section 23 may even go to 5:1 or higher. As this ratio increases, the material becomes squeezed into the smaller flights 24 and, thus experiences a greater shearing pressure.

Naturally, the pressure experienced by the polymer in the flights 24 also depends upon the size of the orifice through which it passes when departing the extruder. At the small orifice sizes of 0.015, 0.010, or even 0.005 inch, only a small amount of resin leaves the extruder over a period of time. The remainder backs up against the orifice opening and maintains the pressure upon the polymer in the pump section 23.

Larger orifices, of course, allow the pressure in the metering section 23 to dissipate. However, placing a screen, called a breaker plate, adjacent to the screw's working section 30 can retain a sufficient back pressure on the metering section 23. This screen can have a mesh of 100 or finer.

Placing additional obstacles in the path of the molten polymer beyond the breaker plate can also increase the pressure experienced in the metering section 23. Furthermore, a longer land, which is the distance along which the bore of the extruder narrows down to the orifice size, can also retain the desired pressure in the flights 24. A pressure blender and a mixing head can also give increased pressure. An extruder with the appropriate modification can deliver the resin to its die under a pressure of 3,000 p.s.i. at the breaker plate.

Once produced, the material, as a thermoplastic, will submit to the usual product-forming techniques. Thus, it can undergo further extrusion to a particular shape, if not achieved in the original extrusion. Moreover, its thermoplastic nature allows the reuse of scraps of material and of rejected parts.

Figure 2:
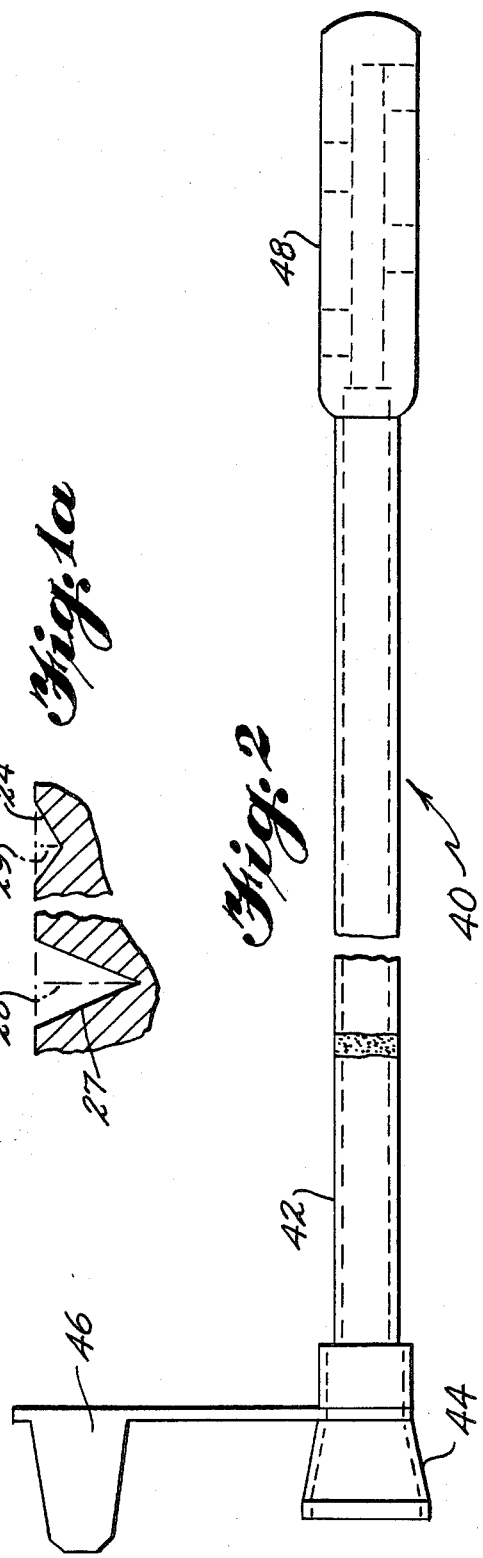
FIG. 2 illustrates the enteral feeding tube of this invention wherein openings are provided in the weighted bolus.

FIG. 2 illustrates one embodiment of the present invention. Enteral feeding tube, generally designated by the numeral 40, comprises a stem 42 having one end (proximal end) connected to female connector 44 integrally formed with plug 46 and the other end (distal end) connected to weighted bolus 48. Both the connector 44 and weighted bolus 48 are attached to the stem 42 by insert molding to be described below.

In FIGS. 3-5, only the distal end of the enteral feeding tube is shown. It is understood that the proximal end of the tube is connected to a female connector with plug as shown in FIG. 2.

FIG. 3 illustrates in further detail the bolus and stem. Bolus 50 is generally cylindrically shaped, having end 50a connected to stem 52 and the other end 50b being rounded or devoid of sharp edges to avoid injuring the patient. Disposed within bolus 50 is a central bore 54 which extends longitudinally from end 50a through almost the entire length of bolus 50. Bore 54 terminates at a distance from end 50b so as to define a closed end. A plurality of openings 56 connect bore 54 with the exterior of bolus 50. Although four openings are shown in FIG. 3, this number is not critical as long as one or more openings are used. End 50a is joined to stem 52 which is in the form of a tube. Thus, liquid nutrient can be fed to a patient through the enteral feeding tube after the bolus has been inserted into the patient's stomach or intestines. Conversely, stomach fluids can be drained from the patient's stomach by using the enteral feeding tube.

FIG. 4 shows another embodiment of the present invention. The construction of the bolus 60 is similar to that shown in FIG. 3, with the exception that central bore 62 extends through the entire length of the bolus. Thus, bolus 60 is provided with end opening 64 and side openings 66.

FIG. 5 illustrates a further embodiment of the present invention. As shown in FIG. 5, enteral feeding tube 70 comprises only stem 72, no bolus being connected thereto. The distal end of stem 72 is provided with a plurality of openings 74 including end opening 76.

In the above described embodiments, the stem is formed of the polymeric composition described hereinabove. More specifically, the formulation shown in Table I is most preferred. As shown in Table I, two block copolymers having different amounts of terminal A blocks and middle B blocks are used in forming the stem.

TABLE I

| Material Components | Weight % |
|---|---|
| Kraton G-1651 Shell Oil Co. | 15-20 |
| Kraton G-1650 Shell Oil Co. | 3-6 |

TABLE I-continued

| Material Components | Weight % |
|---|---|
| Polypropylene #5520 Shell Oil Co. | 1-5 |
| Polypropylene #5820 Shell Oil Co. | 20-25 |
| Polypropylene #467DP Eastman Corp. | 1-3 |
| Silicone Oil, #360 Dow Corning | 3-5 |
| Mineral Oil Witco Chem Co. | 40-50 |
| Stabilizer Irganox #1010 Ciba Geigy Corp. | 0.01-0.1 |

In forming the stem, it may be desirable to add to the formulation a radiopaque material such as bismuth oxychloride or barium sulfate. In such an event, the amount of radiopaque material added usually constitutes 5% to 50% by weight of the resulting mixture. Generally, when bismuth oxychloride is used, this compound together with the polymeric composition are added to the extruder to form an extrudate containing about 5 to 20 weight percent bismuth oxychloride. Alternatively, barium sulfate may be co-extruded as a stripe in the stem. In such an event, the amount of barium sulfate used constitutes about 10 to 50 weight percent of the resulting product.

With reference to the weighted bolus, this is formed by mixing the polymeric composition with a heavy material such as tungsten particles. Since tungsten is non-toxic, its presence in the bolus does not adversely affect the health of the patient. The polymeric composition may comprise one or more of the thermoplastic elastomeric block copolymers having different amounts of terminal A blocks and middle B blocks. Other ingredients which may be present in the composition include polypropylene and mineral oil. The tungsten particles typically have an average particle diameter of about 2 to 6 microns (150 mesh). The material for the bolus comprises from about 10 to 20 weight percent of the polymeric composition containing the thermoplastic elastomeric hydrocarbon block copolymer and from about 80 to 90 weight percent of the tungsten powder.

A typical formulation for the bolus is shown in Table II.

TABLE II

| Material Components | Weight % |
|---|---|
| Tungsten powder, 150 mesh | 85-90 |
| Kraton G-1651 Shell Oil Co. | 4-6 |
| Kraton G-1650 Shell Oil Co. | 1-2 |
| Polypropylene #467DP Eastman Corp. | 0.3-0.5 |
| Polypropylene #5520 Shell Oil Co. | 0.1-0.2 |
| Polypropylene #5820 Shell Oil Co. | 0.2-0.6 |
| Silicone Oil #360 Dow Corning | 0.3-0.7 |
| Mineral Oil Witco Chem Co. | 4-6 |
| Stabilizer, Irganox #1010 Ciba-Geigy Corp. | 0.006 |

As to the integrally formed female connector and plug, these are made of the above-described thermoplastic elastomeric hydrocarbon block copolymer. For easy identification, the connector and plug are usually colored. Thus, a typical formulation for the connector and plug is shown in Table III.

Both the female connector with plug and weighted bolus are directly conected to the stem by insert molding. Since all of the parts are made of the same general polymeric composition, a very firm bond is obtained.

It has been found that the stem can be most conveniently formed by extrusion. The female connector with plug and weighted bolus are then formed onto the stem by injection molding.

TABLE III

| Material Components | Weight % |
|---|---|
| Kraton G-2705 Shell Oil Co. | 97.00 |
| Silicone Oil #360 Dow Corning | 1.98 |
| Colorant | .991 |

The present invention is further illustrated in the following examples. Since the examples are for illustration, they are not to be construed as limiting.

EXAMPLE 1

This example illustrates the formation of the stem portion of the present enteral feeding tube.

20 lbs of a polymer composition having the following formulation is mixed with 2 lbs of barium sulfate and fed to the hopper of a 1" Killion extruder.

| Material Components | Weight % |
|---|---|
| Kraton G-1651 Shell Oil Co. | 18.4 |
| Kraton G-1650 Shell Oil Co. | 4.6 |
| Polypropylene #5520, Shell Oil Co. | 3.0 |
| Polypropylene #5520 Shell Oil Co. | 23.0 |
| Polypropylene #467DP Eastman Corp. | 2.0 |
| Silicone Oil #360 Dow Corning | 4.0 |
| Mineral Oil Witco Chem Co. | 45.0 |
| Stabilizer, Irganox #1010 Ciba Geigy Corp. | 0.05 |
| Total | 100.05 |

The mixture is extruded into a tubing under the conditions set forth below.

| Feed Zone temperature | 300° F. |
|---|---|
| Transition Zone temperature | 350° F. |
| Metering Zone temperature | 355° F. |
| Working Zone (die) temperature | 360° F. |
| Screen packs | 40-60-80 mesh |
| Extruder speed | 23 ft./min. |

The tubing is cut to 35½ inch length and marked at 19.7 inch from one end.

EXAMPLE 2

This example shows the preparation of the polymeric composition used for forming the weighted bolus.

0.069 lb of a block copolymer A-30 and 0.056 lb. of a block cololymer A-50, the formulations for both A-30 and A-50 being shown below, are prepared.

| Material Components | Weight % |
|---|---|
| Block copolymer A-30 | |
| Kraton G-1651 Shell Oil Co. | 32.2 |
| Kraton G-1650 Shell Oil Co. | 13.8 |
| Polypropylene #467DP Eastman Corp. | 5.0 |
| Silicone Oil #360 Dow Corning | 4.0 |
| Mineral Oil | 45.0 |
| Stabilizer, Irganox #1010 Ciba Geigy Corp. | 0.05 |
| Total | 100.05 |
| Block copolymer A-50 | |
| Kraton G-1651 Shell Oil Co. | 30.4 |
| Kraton G-1650 Shell Oil Co. | 7.6 |
| Polypropylene #5520 Shell Oil Co. | 3.0 |
| Polypropylene #5820 Shell Oil Co. | 8.0 |
| Polypropylene #467DP Eastman Corp. | 2.0 |
| Silicone Oil #360 Dow Corning | 4.0 |
| Mineral Oil Witco Chem Co. | 45.0 |
| Stabilizer, Irganox #1010 Ciba Geigy | 0.05 |
| Total | 100.05 |

0.875 lb. of tungsten powder, 150 mesh, having an average diameter of 2 to 6 microns, is divided into three approximately equal portions.

The copolymers which are in pellet form are fed to a Banbury mixer operating at 50 rpm, Sterlco Banbury temperature (°F.) of 400/300, drop temperature (°F.) of 320/340 with a total mixing time of 25-35 minutes. The copolymers are mixed for about 6-9 minutes. The first portion of the tungsten powder is added, with the mixture being mixed for about 4-6 minutes. Thereafter, the second portion of tungsten powder is added and mixed for about 7-9 minutes. The last portion of the tungsten powder is then added and mixed for about 10 to 12 minutes.

The mixture is removed from the Banbury mixer, placed on a two-roll mill and rolled into a sheet having a thickness of about 0.075 to 0.250 inch. The formed sheet is permitted to cool at room temperature for about 10 to 30 minutes, after which it is granulated.

Although it is shown in this Example that two separate block copolymer formulations A-30 and A-50 are mixed, it is understood that a single formation having the identical composition as the combined formulations can be used. Since there is no reaction among the ingredients forming the block copolymer, the sequence of mixing of the ingredients is immaterial.

EXAMPLE 3

This example illustrates the formation of a colored female connector and plug which are joined to the stem of Example 1.

0.99 lb. of block copolymer A-50M described below is mixed with 0.01 lb. of orange colorant.

| Material Components | Weight % |
|---|---|
| Kraton G-2705 Shell Oil Co. | 98 |

-continued

| Material Components | Weight % |
|---|---|
| Silicone Oil #360 Dow Corning | 2 |

The mixture is then added to a Banbury mixer which is operated under the following conditions:

| Drop temperature, °F. | 310 |
|---|---|
| Sterlco Banbury temperature, °F. | 410/320 |
| Screw speed | 50 rpm |
| Mix time | 15 minutes |

Thereafter, the mixture is placed on a two-roll mill at a speed setting of 15 ft./min. and formed into a sheet which is then granulated.

To form the female connector onto the stem of Example 1, a 15-ton Boy press is used and operated under the following conditions:

| Mold temperature, both halves, °F. | 120° F. |
|---|---|
| Nozzle heat set at 60 on Variac | |
| Front zone temperature, °F. | 450 |
| Rear zone temperature, °F. | 430 |
| Injection speed | full open |
| Screw RPM | 200 |
| Mold open time | 1 sec. |
| Injection time | 3.5 sec. |
| Cool time | 15 sec. |
| Shot size setting | 13 |
| Cushion | ⅛ inch |

The mold is opened and the tubing is placed on to the core pin; care is exercised to insure placement of the tubing into the tubing channel. The core pin is placed into the mold. The mold is closed and the copolymer/colorant mixture is injected to form the connector. When the mold opens, the formed product is removed from the core pin and inspected for major molding flaws such as sinks and short-shot.

The weighted bolus is then insert molded onto the marked other end of the stem using a 15 ton Boy press under the same conditions. The polymeric material injected is that shown in Example 2.

What is claimed is:

1. An enteral feeding tube comprising a tubular stem and a unitary, molded weighted bolus connected to one end of the stem, the bolus having a central bore communicating with the interior of the stem and extending over at least a portion of the length of the bolus, the central bore being in communication with the exterior of the bolus through at least one opening in the bolus and the bolus being insert molded at the time of its formation onto the preformed stem, the bolus and the stem having substantially the same polymeric composition comprising a thermoplastic elastomeric hydrocarbon block copolymer and an essentially linear polysiloxane having a kinematic viscosity of 20 to $10^6$ centistokes at room temperature, the polysiloxane constituting from about 0.1 to 12% by weight of the polymeric composition and the weighted bolus is formed of a mixture of from about 10 to 20 weight percent of said polymer composition and 80 to 90 weight percent of tungsten powder.

2. The tube of claim 1 further comprising a female connector with plug formed of the polymeric composition and insert molded to the stem at the end opposite the bolus.

3. The tube of claim 1 wherein the polymeric composition further comprises up to 60% by weight, based on the composition, of mineral oil.

4. The tube of claim 3 wherein the polymeric composition further comprises up to 40% by weight, based on the composition, polypropylene.

5. The tube of claim 4 wherein a radiopaque material is incorporated in the composition in an amount of about 10% by weight based on the composition.

6. The tube of claim 5 wherein the block copolymer has an A - B - A configuration where A is a monovinyl arene polymer block and B is a hydrogenated or non-hydrogenated conjugated diene polymer block.

7. The tube of claim 6 wherein A comprises a styrene block and has a molecular weight of 5,000 to 40,000 and B comprises an ethylene-butylene block and has a molecular weight of 20,000 to 50,000.

8. The tube of claim 7 wherein the block copolymer comprises a mixture of thermoplastic elastomeric hydrocarbon block copolymers, each having different amounts of A and B blocks.

9. The tube of claim 8 wherein the total molecular weight of the polymeric composition ranges from 50,000 to 600,000.

10. The tube of claim 9 wherein the polysiloxane has the repeating structure:

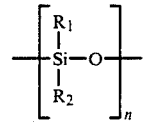

wherein $R_1$, $R_2$=H,

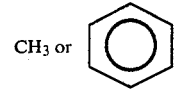

$CH_3$ or and n is a positive integer ranging from 10 to 20,000.

11. The tube of claim 1 wherein the central bore in the bolus extends along the entire length of the bolus.

12. The tube of claim 1 wherein the tungsten powder has an average particle diameter of about 2 to 6 microns.

13. The tube of claim 1 wherein the polymeric composition forming said stem comprises
  (a) from about 18 to 26 weight percent of at least one thermoplastic elastomeric hydrocarbon block copolymer;
  (b) from about 3 to 5 weight percent of the essentially linear polysiloxane;
  (c) from about 22 to 33 weight percent of polypropylene, and
  (d) from about 40 to 50 weight percent of mineral oil.

14. The tube of claim 13 wherein the weighted bolus is formed from a composition which comprises
  (a) from about 5 to 8 weight percent of at least one thermoplastic elastomeric hydrocarbon block copolymer;
  (b) from about 0.3 to 0.7 weight % of the essentially linear polysiloxane;
  (c) from about 0.6 to 1.3 weight percent of polypropylene (d) from about 4 to 6 weight percent of mineral oil; and (e) from about 85 to 95 weight percent of tungsten powder.

15. The tube of claim 1 which further comprises a female connector with plug at the end of the stem opposite said weighted bolus.

16. The tube of claim 15 wherein said female connector comprises a thermoplastic elastomeric hydrocarbon block copolymer and an essentially linear polysiloxane.

17. The tube of claim 15 wherein both the female connector and weight bolus are directly connected to the stem by insert molding.

18. The tube of claim 15 wherein the stem further comprises a radiopaque material.

19. In a method of feeding a patient comprising inserting an enteral feeding tube into the patient's gastrointestinal tract, the improvement comprising using the enteral feeding tube of claim 1.

20. In a method of feeding a patient comprising inserting an enteral feeding tube into the patient's gastrointestinal tract, the improvement comprising using the enteral feeding tube of claim 11.

21. The tube of claim 1 wherein the central bore is in communication with the exterior of the bolus through a plurality of openings.

22. A unitary weighted bolus for medical tubing formed from a composition of matter comprising a mixture of (a) from about 5 to about 8% of a thermoplastic elastomer hydrocarbon block copolymer;

(b) from about 0.3 to 0.7% of an essentially linear polysiloxane having a kinematic viscosity of 20 to $10^6$ centistokes at room temperature; and (c) from about 80 to 90% of tungsten powder all percentages being by weight and based on the composition, said bolus having a central bore for communication with the interior of said tubing and extending over at least a portion of the length of the bolus, the central bore being in communication with the exterior of the bolus through at least one opening in the bolus, said bolus being insert molded at the time of its formation directly to said tubing.

23. The weighted bolus of claim 22 wherein the tungsten particles have an average particle diameter of from about 2 to 6 microns.

24. The weighted bolus of claim 23 wherein the composition comprises from about 10 to 20 weight % of the biocompatible material and from 80 to 90% by weight of the tungsten particles.

25. The weighted bolus of claim 22 wherein the composition of matter comprises from 10 to 20% by weight of the biocompatible material and from 80 to 90% by weight of the tungsten particles.

26. The weighted bolus of claim 22 which further comprises (d) from about 0.6 to 1.3% of polypropylene and (e) from about 4 to 6 percent mineral oil.

27. The weighted bolus of claim 22 wherein the tungsten particles have an average-particle diameter of from about 2 to 6 microns.

* * * * *